(12) United States Patent
Ozkan

(10) Patent No.: US 9,497,653 B2
(45) Date of Patent: Nov. 15, 2016

(54) GENERATING AND ANALYZING MOBILITY VECTORS TO DETERMINE SUBSCRIBER BEHAVIOR

(71) Applicant: AT&T Intellectual Property I, L.P., Atlanta, GA (US)

(72) Inventor: Mehmet Ozkan, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 154 days.

(21) Appl. No.: 14/090,559

(22) Filed: Nov. 26, 2013

(65) Prior Publication Data

US 2015/0148041 A1    May 28, 2015

(51) Int. Cl.
*H04W 36/00* (2009.01)
*H04W 24/10* (2009.01)
*H04W 36/08* (2009.01)

(52) U.S. Cl.
CPC ............. *H04W 24/10* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 7,756,534 B2 | 7/2010 | Anupam et al. | |
| 8,190,194 B2 | 5/2012 | Brisebois | |
| 8,315,598 B2 | 11/2012 | Price | |
| 8,442,555 B2 | 5/2013 | Lowell et al. | |
| 8,504,035 B2 | 8/2013 | Shin et al. | |
| 2005/0213511 A1 | 9/2005 | Reece, Jr. et al. | |
| 2008/0238768 A1 | 10/2008 | Nosworthy | |
| 2009/0271101 A1 | 10/2009 | Relyea et al. | |
| 2009/0281714 A1 | 11/2009 | Boubas et al. | |
| 2010/0159945 A1* | 6/2010 | Brisebois | H04W 4/02 455/456.1 |
| 2011/0099142 A1 | 4/2011 | Karjalainen et al. | |
| 2011/0276396 A1 | 11/2011 | Rathod | |
| 2012/0130817 A1 | 5/2012 | Bousaleh et al. | |
| 2012/0315839 A1 | 12/2012 | Mumcuoglu et al. | |
| 2013/0023247 A1 | 1/2013 | Bolon et al. | |
| 2013/0102283 A1 | 4/2013 | Lau et al. | |
| 2013/0208661 A1* | 8/2013 | Nylander | H04W 48/18 370/328 |
| 2014/0057610 A1* | 2/2014 | Olincy | H04W 4/16 455/414.1 |
| 2014/0329523 A1* | 11/2014 | Tian | H04W 8/245 455/433 |

* cited by examiner

*Primary Examiner* — Suhail Khan
(74) *Attorney, Agent, or Firm* — Hartman & Citrin LLC

(57) ABSTRACT

Concepts and technologies are disclosed herein for generating and analyzing mobility vectors to determine subscriber behavior. A processor can execute an analysis engine. The analysis engine can obtain a log from a data collection device associated with a cellular network. The log can include subscriber data, cell identifier data, and time data. The analysis engine can identify a subscriber represented by the subscriber data and determine a vector associated with the subscriber. The vector can represent a movement of the subscriber within the cellular network. The analysis engine can store vector data that corresponds to the vector determined.

21 Claims, 9 Drawing Sheets

US 9,497,653 B2

GENERATING AND ANALYZING MOBILITY VECTORS TO DETERMINE SUBSCRIBER BEHAVIOR

BACKGROUND

Cellular networks provide communications using cells. As mobile subscribers associated with the cellular network move into a geographic area covered by the cellular network and/or cells of the cellular network, a mobile equipment or other device associated with the subscriber can connect to one of the cells, assuming the device is turned on and/or configured to communicate with the cellular network.

As the subscriber and the associated mobile equipment moves within the geographic area covered by the cellular network, the mobile equipment can disconnect from a first cell of the cellular network and connect to a second cell of the cellular network. This process of disconnecting and connecting is sometimes referred to as a "handoff" or a "handover."

A successful handoff occurs if the mobile equipment connects to the second cell substantially simultaneously with respect to disconnecting from the first cell. An unsuccessful handoff occurs if the mobile equipment disconnects from the first cell and does not connect to the second cell immediately or simultaneously. If a communication is in progress during an unsuccessful handoff, the mobile equipment may experience a dropped call or dropped data connection.

Cellular networks sometimes track handoffs for various purposes. This data can be used to track performance and/or usage of the cellular network, to project growth in demand for connectivity associated with the cellular network and/or cells of the cellular network, to determine traffic conditions, or the like. By analyzing the data, a cellular network operator can know a cell to which a mobile equipment is connected at a particular time.

SUMMARY

The present disclosure is directed to generating and analyzing mobility vectors to determine subscriber behavior. According to various embodiments of the concepts and technologies described herein, logs of handoffs associated with mobile equipment can be obtained by an analysis engine. The functionality of the analysis engine can be provided by an application or module executed by a computer system such as a desktop computer, a workstation, a laptop computer, a server computer, a tablet computer, other computing systems, combinations thereof, or the like. The logs can indicate connection times, disconnection times, and cell identifiers for one or more subscribers.

The analysis engine can have access to geographic information systems ("GIS") technologies and/or other technologies and/or data that can be used to define geographic locations associated with the cells of the network. The analysis engine also can generate vectors associated with a particular mobile equipment or subscriber and/or for multiple devices (e.g., mobile equipment) and/or subscribers. The vectors can be defined as a series of cell identifiers (hereinafter "cell IDs") associated with a subscriber's behavior between two stationary cells. As such, a "vector" as used herein can refer to a list of cell IDs such as, for example, Cell A, Cell B, and Cell C. It should be understood that this example is illustrative and therefore should not be construed as being limiting in any way.

A "stationary cell" and variants thereof can be used to refer to a cell at which a subscriber is located for a time that exceeds a defined threshold for indicating stationary behavior. According to some embodiments, a stationary cell can be defined as a cell in which the subscriber is located for five consecutive minutes or longer, ten consecutive minutes or longer, fifteen consecutive minutes or longer, thirty consecutive minutes or longer, an hour or longer, or the like. For cells in which the subscriber is located for less than the defined threshold for stationary cells, the subscriber can be considered moving or mobile.

The vectors can be further analyzed by the analysis engine to determine behaviors associated with a particular subscriber and/or with multiple subscribers. In particular, the vectors can be used to determine a status and location associated with a particular subscriber. Thus, for example, the analysis engine can determine that a mobile equipment was located in a first cell for a first duration and that the mobile equipment was located in a second cell for a second duration. Depending upon the duration, as explained above, the cell location, and/or other information such as historical data, or the like, the analysis engine can determine that the mobile equipment is stationary at a particular location, mobile at a particular location, that a particular location corresponds to a subscriber's work or home location, and/or that a particular location is travelled through by the subscriber, combinations thereof, or the like.

By determining behavior data and/or vector data for multiple subscribers, the analysis engine can be used to provide meaningful and valuable information about population of a particular location and/or movement of subscribers in, within, or among locations. This information can be provided to one or more requestors via a query/response model and/or via other methodologies. The information also can be provided for a fee and/or as a service to paying customers. It should be understood that these examples are illustrative and therefore should not be construed as being limiting in any way.

According to one aspect of the concepts and technologies disclosed herein, a method is disclosed. The method can include obtaining, at a processor executing an analysis engine, a log from a data collection device associated with a cellular network. The log can include subscriber data, cell identifier data, and time data. The method also can include identifying, by the processor, a subscriber represented by the subscriber data, and determining, by the processor, a vector associated with the subscriber. The vector can represent a movement of the subscriber within the cellular network. The method also can include storing, by the processor, vector data that corresponds to the vector determined.

In some embodiments, the vector can represent a movement of the subscriber through two cells of the cellular network, and the time data can represent a time at which a handoff associated with the device occurred between a first of the two cells and a second of the two cells. In some embodiments, the subscriber data can identify a subscriber, the cell identifier data can identify a cell of the cellular network with which a device associated with the subscriber communicated, and the time data can identify a time at which the device communicated with the cell.

In some embodiments, the method further can include selecting, by the processor, a vector associated with the subscriber, analyzing, by the processor, the vector to determine a status associated with the subscriber if the subscriber is located at a cell corresponding to the vector, and storing, by the processor, status data that can represent the status determined. The status data can be stored as a portion of the vector data. In some embodiments, the status can indicate that the subscriber was either mobile or stationary when the subscriber was located within the cell. In some embodiments, the method further can include retrieving, by the processor, the status data associated with the subscriber, determining, by the processor, a behavior associated with the subscriber if the subscriber is located at the cell, and storing, by the processor, behavior data that can represent the behavior determined. The behavior data can be stored as a portion of the vector data. The behavior can indicate that the subscriber was one of located at home, located at work, and travelling at a time at which the subscriber was located within the cell.

In some embodiments, the method further can include identifying, by the processor, a subscriber located within a cell, and determining, by the processor, an origination cell associated with the subscriber. The origination cell can include one of a work cell and a home cell. The method also can include determining, by the processor, that the cell and the originating cell do not match, and determining, by the processor, that the subscriber is a visitor in response to determining that the cell and the originating cell do not match. The method also can include determining, by the processor, a travel vector associated the cellular network, the travel vector including a plurality of cells corresponding to a travel route through a geographic location covered by the plurality of cells, and storing, by the processor, data defining the travel vectors as part of the vector data. In some embodiments, the method also can include identifying, by the processor, a subscriber located at one of the plurality of cells associated with the travel vector, and identifying, by the processor, the subscriber as a travelling subscriber.

According to another aspect of the concepts and technologies disclosed herein, a system is disclosed. The system can include a processor and a memory. The memory can store computer-executable instructions that, when executed by the processor, cause the processor to perform operations. The operations can include obtaining a log from a data collection device associated with a cellular network. The log can include subscriber data, cell identifier data, and time data. The operations further can include identifying a subscriber represented by the subscriber data, and determining a vector associated with the subscriber. The vector can represent a movement of the subscriber within the cellular network. The operations also can include storing vector data that corresponds to the vector determined.

In some embodiments, the logs can include data defining handoffs between cells of the cellular network, and the data collection devices can include a home location register associated with the cellular network. In some embodiments, the operations further can include selecting a vector associated with the subscriber, analyzing the vector to determine a status associated with the subscriber if the subscriber is located at a cell corresponding to the vector, and storing status data that can represent the status determined. The status data can be stored as a portion of the vector data. In some embodiments, the system can include computer-executable instructions that, when executed by the processor, cause the processor to perform operations further including retrieving the status data associated with the subscriber, determining a behavior associated with the subscriber if the subscriber is located at the cell, and storing, by the processor, behavior data that can represent the behavior determined. The behavior data can be stored as a portion of the vector data.

In some embodiments, the system also can include computer-executable instructions that, when executed by the processor, cause the processor to perform operations that further include identifying a subscriber located within a cell, and determining an origination cell associated with the subscriber. The origination cell can include one of a work cell and a home cell. The operations further can include determining that the cell and the originating cell do not match, and determining that the subscriber is a visitor in response to determining that the cell and the originating cell do not match. The system also can include a computing device that is configured to generate a query, and computer-executable instructions that, when executed by the processor, cause the processor to perform additional operations. The additional operations can include receiving the query, executing the query against the vector data, generating a report including data responsive to the query, and providing the report to a requestor associated with the query.

According to another aspect of the concepts and technologies disclosed herein, a computer storage medium is disclosed. The computer storage medium can have computer-executable instructions stored thereon that, when executed by a processor, cause the processor to perform operations including obtaining a log from a data collection device associated with a cellular network, the log including subscriber data, cell identifier data, and time data; identifying a subscriber represented by the subscriber data; and determining a vector associated with the subscriber. The vector can represent a movement of the subscriber within the cellular network, and the operations further can include storing vector data that corresponds to the vector determined.

In some embodiments, the medium further can include computer-executable instructions that, when executed by the processor, cause the processor to perform operations including selecting a vector associated with the subscriber, analyzing the vector to determine a status associated with the subscriber if the subscriber is located at a cell corresponding to the vector, and storing status data that can represent the status determined. The status data can be stored as a portion of the vector data. In some embodiments, the medium further can include computer-executable instructions stored thereon that, when executed by the processor, cause the processor to perform operations including retrieving the status data associated with the subscriber, determining a behavior associated with the subscriber if the subscriber is located at the cell, and storing behavior data that can represent the behavior determined. The behavior data can be stored as a portion of the vector data. In some embodiments, the medium further can include computer-executable instructions that, when executed by the processor, cause the processor to perform operations including identifying a subscriber located within a cell, and determining an origination cell associated with the subscriber. The origination cell can include one of a work cell and a home cell. The operations further can include determining that the cell and the originating cell do not match, and determining, by the processor, that the subscriber is a visitor in response to determining that the cell and the originating cell do not match.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
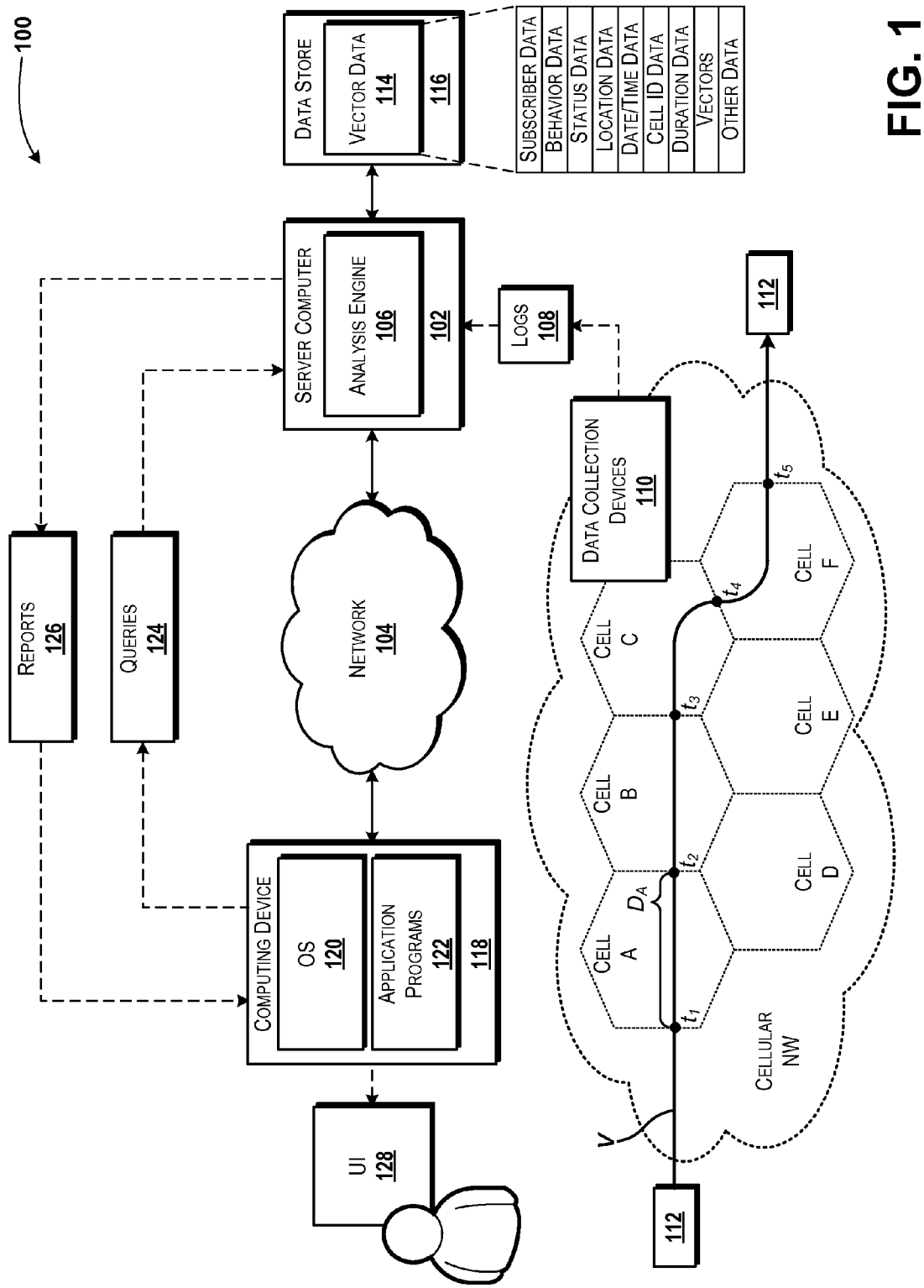
FIG. 1 is a system diagram illustrating an illustrative operating environment for the various embodiments disclosed herein.

The following detailed description is directed to generating and analyzing mobility vectors to determine subscriber behavior. According to various embodiments of the concepts and technologies described herein, a server computer executes an analysis engine that can be configured to obtain one or more logs of handoffs and/or handoff activity associated with a cellular network. The logs can be obtained from one or more data collection devices associated with the cellular network and/or the analysis engine. The logs can include data that indicates, subscriber identifiers, connection times, disconnection times, cell identifiers, and/or other information.

The analysis engine can generate vectors associated with a particular mobile equipment or subscriber and/or for multiple devices (e.g., mobile equipment) and/or subscribers based upon an analysis of the logs. The vectors can be generated by knowing two connection times for a subscriber, a connection time at a first cell and a connection time at a second cell, for example. The vectors can be further analyzed by the analysis engine to determine behaviors associated with a particular subscriber and/or with multiple subscribers.

According to some embodiments of the concepts and technologies described herein, the vectors can be used to determine a status and location associated with a particular subscriber. Thus, for example, the analysis engine can identify, based upon locations, durations, patterns, or the like, that a particular cell corresponds to a home address for a particular subscriber, that a different cell corresponds to a work location for the subscriber, that other cell(s) correspond(s) to a travel route for the subscriber, combinations thereof, or the like. Furthermore, the analysis engine can determine weekday, weekend, holiday, and/or other schedules for the subscriber for various reasons. It should be understood that some subscribers may stay within a particular cell, but that many subscribers move within cells and therefore this information can be useful and/or valuable.

The analysis engine can generate reports and/or other output relating to the determined behavior for various purposes and/or users. For example, the reports can be used to determine and/or transmit advertisements, for use in capacity planning, to recognize patterns, to recognize visiting users at a particular location, to determine travel routes between multiple cells, combinations thereof, or the like. Because the data can be used for additional and/or alternative purposes, it should be understood that these examples are illustrative and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for generating and analyzing mobility vectors to determine subscriber behavior will be described, according to an illustrative embodiment. The operating environment 100 shown in FIG. 1 includes a server computer 102 operating in communication with and/or as part of a communications network ("network") 104.

According to various embodiments, the functionality of the server computer 102 may also be provided by other computing systems such as, for example, one or more desktop computers, one or more laptop computers, other computing systems, or the like. It should be understood that the functionality of the server computer 102 can be provided by a single device, by two similar devices, and/or by two or more dissimilar devices. Furthermore, the server computer 102 can be operated as a distributed computing system over multiple computers or processors as defined herein. For purposes of describing the concepts and technologies disclosed herein, the server computer 102 is described herein as a single server computer. It should be understood that this embodiment is illustrative and should not be construed as being limiting in any way.

The server computer 102 can execute a server application or module to provide the functionality described herein for generating and analyzing mobility vectors to determine subscriber behavior. In the illustrated embodiment, the server computer 102 executes an analysis engine 106. It should be understood that this example is illustrative and therefore should not be construed as being limiting in any way.

The analysis engine 106 can be configured to obtain one or more call logs, handoff or handover logs, call detail records ("CDRs"), and/or database records in a relational database management system ("RDMS") (hereinafter collectively and/or generically referred to as "logs") 108. The logs 108 can include records associated with various data collection devices 110 associated with a cellular network (labeled "Cellular NW" in FIG. 1). The data collection devices 110 can be configured to track the various data associated with the logs 108 and/or to report the logs 108 to the analysis engine 106 on-demand, upon request, and/or automatically.

According to various embodiments, the data collection devices 110 can correspond to various elements of the cellular network that can be configured to track connection, disconnection, subscriber, and/or handoff information. Thus, according to various embodiments, the data collection devices 110 can include, but are not limited to, one or more elements of the cellular network such as, for example, a home location register ("HLR"), a visiting location register ("VLR"), databases for maintaining CDRs or other records, various operations support systems ("OSS") and/or billing support systems ("BSS"), network management systems, RDMSs, combinations thereof, or the like. According to various embodiments, these and other data included in the logs 108 can be collected together and/or sorted by unique identifiers such as a mobile subscriber integrated services digital network-number ("MSISDN"), an international mobile subscriber identity ("IMSI"), an international mobile equipment identity ("IMEI"), or other subscriber identifiers; an account number, name, or other user identifier; a cell identifier ("cell ID"); location parameters; combinations thereof; or the like.

According to various embodiments, the logs 108 can represent subscribers and their respective entries and/or exits from cells or network divisions. One illustrative example of at least a portion of the logs 108 is shown below in TABLE 1.

TABLE 1

| Subscriber | Entry | Exit | Cell |
| --- | --- | --- | --- |
| Subscriber 1 | 11-13-2014_07:37:31 | 11-13-2014_07:41:03 | A |
| Subscriber 1 | 11-13-2014_07:41:03 | 11-13-2014_15:57:24 | B |
| Subscriber 1 | 11-13-2014_15:57:24 | 11-13-2014_16:02:13 | C |
| Subscriber 1 | 11-13-2014_16:02:13 | 11-13-2014_16:05:37 | F |

As can be seen with reference to TABLE 1, at least a portion of the logs 108 can include a subscriber identifier, a connection or entry time and/or date at which a mobile equipment 112 associated with the subscriber entered or connected to a particular cell, and a disconnect or exit time and/or date at which the mobile equipment 112 associated with the subscriber exited or disconnected from the particular cell. Because the logs 108 can include additional and/or alternative information, it should be understood that this example is illustrative and therefore should not be construed as being limiting in any way.

As shown in FIG. 1, the data included in TABLE 1 can represent movement of the mobile equipment 112 through four cells Cell A, Cell B, Cell C, and Cell F of the cellular network. In particular, the entry time shown in the row corresponding to cell A can correspond to the first time $t_1$ shown in FIG. 1, namely, the time at which the mobile equipment 112 entered Cell A. The exit time shown in the row corresponding to cell A can correspond to the second time $t_2$ shown in FIG. 1, namely, the time at which the mobile equipment 112 exited Cell A and entered Cell B, as also shown as the entry time in the row corresponding to cell B. Based upon these times, a duration $D_A$ for which the mobile equipment 112 was located in Cell A can be determined as the time between the first time $t_1$ and the second time $t_2$. It should be understood that this example is illustrative and therefore should not be construed as being limiting in any way.

Similarly, the exit time shown in the row corresponding to cell B can correspond to the third time $t_3$ shown in FIG. 1, namely, the time at which the mobile equipment 112 exited Cell B and entered Cell C. Similarly, the exit time shown in the row corresponding to cell C can correspond to the fourth time $t_4$ shown in FIG. 1, namely, the time at which the mobile equipment 112 exited Cell C and entered Cell F. Similarly, the exit time shown in the row corresponding to cell F can correspond to the fifth time $t_5$ shown in FIG. 1, namely, the time at which the mobile equipment 112 exited Cell F.

It can be appreciated with reference to FIG. 1 and TABLE 1 above, that a vector V can be defined as Cell A, Cell B, Cell C, Cell F, and the data associated with the vector V can include the cell IDs for these cells, a subscriber identifier associated with the mobile equipment 112, times at which each cell in the vector V was entered and/or exited from by the subscriber and/or the mobile equipment 112 associated with the subscriber, an indication as to whether the subscriber was mobile or stationary in the cell, combinations thereof, or the like. According to various embodiments, the vector V can be denoted as Cell A, Cell B, Cell C, Cell F, ABCF, or other notations. It should be understood that this example is illustrative and therefore should not be construed as being limiting in any way.

According to various embodiments of the concepts and technologies described herein, the logs 108 can be generated by various sub-systems or devices from data provided from the data collection devices 110, and in some embodiments, the data collection devices 110 can generate the logs 108 directly. The logs 108 can be provided to the analysis engine 106 to enable the analysis engine 106 to classify and/or analyze mobility data associated with one or more subscribers, to store vector data 114.

The vector data 114 can include various data extracted by the analysis engine 106 from the logs 108. Additionally, or alternatively, the vector data 114 can include data extrapolated by the analysis engine 106 based upon the data in the logs 108. As shown in FIG. 1, the vector data 114 can include subscriber data, behavior data, status data, location data, date/time data (referred to in the claims as "time data"), cell ID data, duration data, vectors, other data, combinations thereof, or the like. It can be appreciated with reference to TABLE 1 above, that the subscriber data, data/time data, and cell ID data may be extracted from the logs 108, in some embodiments. Thus, the other data may be extrapolated from data in the logs 108, if desired.

In particular, the analysis engine 106 can be configured to generate vectors that represent movement of a subscriber between and/or among cells based upon the logs 108. The vectors can be defined as a list of stationary cells in which a subscriber is located and/or passes through, and can be determined based upon two or more of connections or disconnections. Thus, the analysis engine 106 can represent, as a vector or otherwise, a list of cells visited by the subscriber. The analysis engine 106 can use the vector, as well as determined durations in the cells of the vector, to determine a duration and/or a rate of movement between the two or more connections and/or disconnections. The vectors and determined status in each cell in the vector can be used to generate the status data. The status data can indicate, among other things, if the subscriber is or was mobile or stationary when located at particular cell, or the like.

According to some embodiments of the concepts and technologies described herein, a duration threshold can be defined by the analysis engine 106 to determine if a subscriber is mobile or stationary in a cell included in a vector. In some embodiments, the time threshold can be five minutes or less in a cell to detect mobility in that cell and/or five minutes, one second or more to indicate being stationary in that cell. Other time thresholds such as ten minutes, fifteen minutes, or the like are contemplated and are possible. It can be appreciated that the time threshold can be determined for a particular cell based upon the size of the cell and other factors such as a type of traffic in or near the cell (a cell that serves an interstate may have a lower time threshold to indicate status compared to a cell that serves only hiking trails). The vectors, status, and duration also can be used to generate the behavior data. The behavior data can indicate, for example, if the subscriber was at a home location, at a work location, travelling, at a shopping location, visiting a location away from a home location, work location, and/or travel route, or elsewhere when located at a particular cell. The behavior data can be generated by analyzing vector patterns, rates of speed, and/or durations of stays within cells, all of which may be represented by the vector data 114.

The analysis engine 106 also can generate duration data that defines or represents the durations as explained above. Thus, the duration data can define how long the subscriber was located within cells associated with a vector. The duration data can be used in conjunction with the vectors, the behavior data, and/or the status data, as well as other information, in some embodiments. The analysis engine 106 also can determine location data. As noted above, the analysis engine 106 can determine the location data based upon GIS information and/or other data, which the analysis engine 106 can correspond with cell IDs and/or other data to determine geographic locations. As such, the analysis engine 106 can determine, based upon a cell ID, an actual geographic location corresponding to the geographic location served by the cell associated with the cell ID. Thus, the analysis engine 106 can determine, based upon the logs 108, these and other behaviors of the subscriber.

The analysis engine 106 also can use the data in the logs 108 to generate the other data. The other data can include, for example, information indicating connectivity status, types of connections (e.g., voice, data, protocols, or the like), patterns and/or histories associated with subscribers, travel paths, or the like. These and other information can be extracted and/or extrapolated from the data included in the logs 108 and stored as the vector data 114 in a data storage device such as a database, server, table, or data store ("data store") 116. The data store 116 can be configured to support queries and/or other operations against the vector data 114, if desired, as will be explained in more detail below.

The operating environment 100 shown in FIG. 1 also can include a computing device 118 operating in communication with and/or as part of a communications network ("network") 104. According to various embodiments, the functionality of the computing device 118 may be provided by one or more server computers, one or more desktop computers, one or more tablet or slate computers, one or more laptop computers, one or more mobile telephones or smartphones, other computing systems, or the like. For purposes of describing the concepts and technologies disclosed herein, the computing device 118 is described herein as a personal computer such as a desktop, laptop, or tablet computer. It should be understood that this embodiment is illustrative, and should not be construed as being limiting in any way.

The computing device 118 can execute an operating system 120 and one or more application programs 122 such as, for example, a web browser, productivity software, personal information management ("PIM") software, combinations thereof, or the like. The operating system 120 is a computer program for controlling the operation of the computing device 118. The application programs 122 can include executable programs configured to execute on top of the operating system 120 to provide various functions.

According to various embodiments, the application programs 122 include a web browser. Because the application programs 122 can include almost any kind of natively executed and/or web-based applications, the described embodiments should be understood as being illustrative and should not be construed as being limiting in any way. The computing device 118 can be used to generate one or more queries 124. The queries 124 can request, for example, a report relating to a subscriber, a location, a cell, a network, a travel path or vector, a status, a vendor, and/or other entities that may be represented by the vector data 114.

In one contemplated embodiment, a web browser or other application program 122 can be executed by the computing device 118 to access the analysis engine 106 or other application or module executed and/or hosted by the server computer 102 or other computing device. Via interactions with the analysis engine 106, the computing device 118 can submit and/or execute one or more queries 124 against the vector data 114. The analysis engine 106 can execute the queries 124 against the vector data 114, identify records that are responsive to the queries 124, and generate one or more reports that are to be output to the computing device 118. The reports 126 can be provided to the computing device 118 as a response to the one or more queries 124. It should be understood that this example is illustrative and therefore should not be construed as being limiting in any way.

The computing device 118 also can be configured to present the data in the reports 126 to various entities. In some embodiments, for example, the computing device 118 can forward the reports 126 or data relating to the reports 126 to various advertisers, or the like, so the advertisers can generate location-based advertisements. In some other embodiments, the computing device 118 can forward the reports 126 or data relating to the reports 126 to retailers, vendors, venue owners or operators, network operators, traffic systems or devices, government entities, or the like, for various purposes such as identifying visitor trends and/or capacities, for traffic and/or other resource planning, combinations thereof, or the like. In yet other embodiments, the computing device 118 can be configured to forward the reports 126 or data relating to the reports 126 to various network elements or entities for capacity planning, resource allocation planning, other purposes, combinations thereof, or the like.

In some other embodiments, the computing device 118 can be configured to generate one or more user interfaces ("UIs") for presenting the reports 126 or data relating to the reports 126 to one or more users or other entities. Thus, for example, a user can interact with the computing device 118 to generate the queries 124, and to view data that satisfied the queries 124. It should be understood that these examples are illustrative and therefore should not be construed as being limiting in any way.

According to various embodiments of the concepts and technologies described herein, the analysis engine 106 can be configured to perform various operations on the logs 108, to generate and store the vector data 114, and to generate reports 126 by analysis of and/or by executing queries 124 against the vector data 114.

In some embodiments, the analysis engine 106 can be configured to obtain the logs 108 from the data collection devices 110, identify one or more subscribers associated with data included in the logs 108, and to determine one or more vectors representing movement of the subscribers within cells. The analysis engine 106 can generate vector data 114 that represents the determined vectors, as well as other aspects of the logs 108 such as, for example, subscriber data, behavior data, status data, location data, date and/or time data, cell ID data, duration data, other data, combinations thereof, or the like. The analysis engine 106 can analyze the vector data 114 for various purposes.

In some embodiments, the analysis engine 106 can analyze vectors represented by the vector data 114. The analysis engine 106 can select vectors associated with a particular subscriber, analyze the vectors, and calculate, based upon the vectors, a status and location associated with the subscriber when located at or within one or more cells covered by the vectors. The status can indicate, for example, mobile, stationary, slowly moving, quickly moving, a rate of speed, or the like. The location can include a geographic location or an identifier that specifies the cell as corresponding to a home address, work address, travel route, combinations thereof, or the like. The analysis engine 106 can populate a database, table, or other data structure with the determined locations and/or status information. In some embodiments, the analysis engine 106 can store or update the vector data 114 to include the status and location information as the status data, location data, other data, or the like. The analysis engine 106 can repeat this analysis for each subscriber represented in the logs 108 and/or vector data 114, if desired. It should be understood that this example is illustrative and therefore should not be construed as being limiting in any way.

In some embodiments, the analysis engine 106 can be configured to determine behaviors of subscribers. For example, the analysis engine 106 can identify cells that correspond to work, home, travel, shopping, or other locations with respect to a particular subscriber and/or that can represent how a subscriber behaves when within those cells. The analysis engine 106 can identify a subscriber and retrieve, from the data store 116, location data and status data associated with the subscriber. The analysis engine 106 can analyze the location data and the status data to determine behaviors of the subscriber as noted above. The analysis engine 106 can generate and store behavior data that defines the behavior of the subscriber when at various cells. Thus, the behavior data can specify, for example, that a subscriber is located at a home location, travelling along a travel route, located at a shopping location, located at a work location, visiting a location, combinations thereof, or the like. The analysis engine 106 can repeat this analysis for each subscriber represented in the logs 108 and/or vector data 114, if desired. It should be understood that this example is illustrative and therefore should not be construed as being limiting in any way.

In some embodiments, the analysis engine 106 can be configured to identify visitors within a cell based upon the vector data 114. In particular, the analysis engine 106 can identify a subscriber, and obtain vectors associated with the subscriber. The analysis engine 106 can analyze the vectors to determine an origin associated with the subscriber and thereby identify visitors within a cell at a particular time. In another embodiment, the analysis engine 106 can identify a cell, identify subscribers within the cell, and determine origins associated with those subscribers. Subscribers who are visiting the cells can be identified as visitors. In some embodiments, the analysis engine 106 can identify visitors by obtaining behavior data associated with subscribers located within the cell and determining, for each of the subscribers, if the cell corresponds to a home or work cell for the subscriber. If not, the subscriber can be defined as a visitor. It should be understood that these examples are illustrative and therefore should not be construed as being limiting in any way.

In some embodiments, the analysis engine 106 can be configured to identify travel vectors or travel routes associated with various cells. This information can be used for various purposes such as, for example, identifying and/or pushing advertisements to subscribers within cells that define the travel routes, dedicating resources for expected increased frequency of handoffs, combinations thereof, or the like. The analysis engine 106 can identify a travel vector associated with a location, identify subscribers located along the travel vector, and output identities of the subscribers. The output identities can be used to allocate resources, to push advertisements, combinations thereof, or the like. It should be understood that this example is illustrative and therefore should not be construed as being limiting in any way.

In some embodiments, the analysis engine 106 can be configured to generate reports 126 or other output based upon queries 124 or other requests. The analysis engine 106 can receive a query 124. In some embodiments, the analysis engine 106 can execute the query 124 against the vector data 114. In some other embodiments, the analysis engine 106 can analyze the vector data 114 to identify data that satisfied the queries 124. The analysis engine 106 can generate a report 126 that corresponds to the determined output, and provide the report 126 to a requestor. It should be understood that this example is illustrative and therefore should not be construed as being limiting in any way. These and additional aspects of the concepts and technologies described herein will be illustrated and described in additional detail below FIG. 1 illustrates one server computer 102, one network 104, one cellular network, one data collection device 110, one mobile equipment 112, one data store 116, and one computing device 118. It should be understood, however, that various implementations of the operating environment 100 include zero, one, or more than one server computer 102, zero, one, or more than one network 104, zero, one, or more than one cellular network, zero, one, or more than one data collection device 110, zero, one, or more than one mobile equipment 112, zero, one, or more than one data store 116, and/or zero, one, or more than one computing device 118. As such, the illustrated embodiment should be understood as being illustrative, and should not be construed as being limiting in any way.

Figure 2:
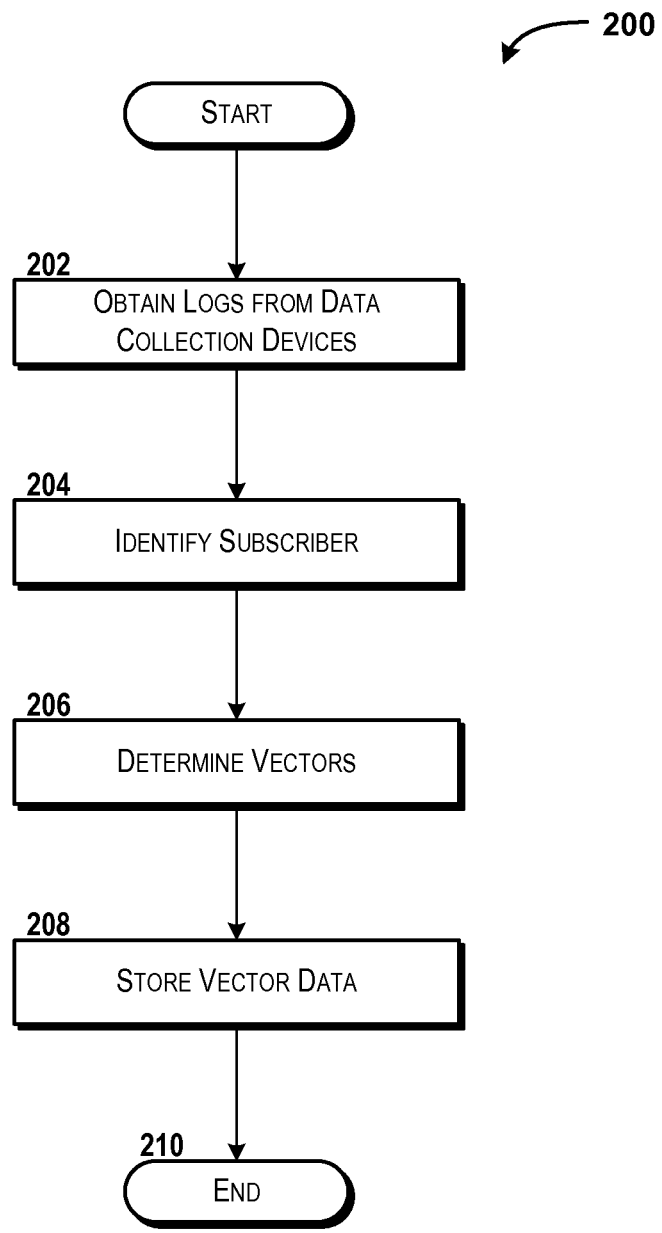
FIG. 2 is a flow diagram showing aspects of a method for generating vector data, according to an illustrative embodiment.

Turning now to FIG. 2, aspects of a method 200 for generating vector data 114 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the analysis engine 106. It should be understood that additional and/or alternative devices and/or network nodes can provide the functionality described herein via execution of one or more modules, applications, and/or other software including, but not limited to, the analysis engine 106. Thus, the illustrated embodiments are illustrative, and should not be viewed as being limiting in any way.

The method 200 begins at operation 202. At operation 202, the server computer 102 can obtain one or more logs 108 from one or more data collection devices 110. As explained above, the logs 108 can include various types of data such as, for example, CDRs, handoff information, subscriber information, cell ID information, combinations thereof, or the like, associated with a network such as the cellular network shown in FIG. 1, the network 104 shown in FIG. 1, the networks illustrated and described in FIG. 8, and/or other networks. As explained above, the logs 108 can represent registrations of devices with hardware associated with various cells, which can be used to generate vectors, other information, or the like. Thus, the logs 108 can include a table, database, or other data structure that can include multiple data points. These data points can be analyzed by the server computer 102 to determine if devices that registered with the cells and/or hardware associated with the cells are mobile, stationary, near a home location, near a work location, travelling, visiting particular cells, travelling along particular cells, combinations thereof, or the like.

From operation 202, the method 200 proceeds to operation 204. At operation 204, the server computer 102 can identify one or more subscribers represented by data included in the logs 108. The server computer 102 can analyze the logs 108 and identify one or more subscribers. With reference to TABLE 1 above, it can be appreciated that one of the columns or rows of a table, database, or other structure can list a subscriber identity or other identifying information. As such, analysis of the logs 108 can include identifying the subscriber indicated in a particular column or other location in the logs 108. The subscribers also can be identified by analyzing the logs 108 to identify known data types associated with subscriber identifiers such as, for example, account numbers, device serial numbers, MSISDNs, IMEIs, IMSIs, combinations thereof, or the like. Because the subscribers represented by the logs 108 can be identified in additional and/or alternative ways, it should be understood that these examples are illustrative and therefore should not be construed as being limiting in any way.

From operation 204, the method 200 proceeds to operation 206. At operation 206, the server computer 102 can determine one or more vectors represented in the logs 108. The vectors can be determined by the analysis engine 106 by analyzing two or more data points in the logs 108. In some embodiments, the analysis engine 106 can analyze two or more consecutive data points in the logs 108, though this is not necessarily the case. For example, a vector can be defined for consecutive data points as shown in the rows of the illustrative example of the logs 108 below in TABLE 2, though this is not necessarily the case.

TABLE 2

| Subscriber | Entry | Exit | Cell |
|---|---|---|---|
| Subscriber 1 | 11-13-2014__09:12:13 | 11-13-2014__12:11:47 | A |
| Subscriber 1 | 11-13-2014__12:11:47 | 11-13-2014__12:15:53 | B |
| Subscriber 1 | 11-13-2014__12:15:53 | 11-13-2014__19:27:58 | C |

In the example shown in TABLE 2, a vector can represent movement of Subscriber 1 through cell A, cell B, and cell C, and data capturing durations of time in each of the cells can also be captured to define behavior of the subscriber in each of the cells. In the above example, the vector can correspond to Cell A, Cell B, Cell C (or ABC or other notations), and data representing a time in each cell included in this vector also can be captured.

In the above example shown in TABLE 2, the duration in Cell A can be defined as one hundred nineteen minutes and thirty four seconds, the duration in Cell B can be defined as four minutes and six seconds, and the duration in Cell C can be defined as three hundred twelve minutes and five seconds. Because the geographic location of the cells can be known, for example using GIS data and the like, an approximate distance travelled by the subscriber can also be determined. Thus, based upon duration in each cell and the known locations of the cells, a rate or speed of movement can also be determined with respect to the vector and/or cells included within the vector. It should be understood that these examples are illustrative and therefore should not be construed as being limiting in any way.

In operation 206, the server computer 102 can generate vectors for the subscriber as represented in the logs 108. It can be appreciated that in sparsely populated areas, cells may or may not be adjacent to one another. As such, the server computer 102 can be configured to extrapolate vectors from sparse data, in some embodiments. As noted above with reference to TABLE 2, an example vector can be defined for the subscriber named Subscriber 1 as Cell A, Cell B, Cell C, or simply ABC (or other desired notation). It should be understood that this example is illustrative and therefore should not be construed as being limiting in any way.

From operation 206, the method 200 proceeds to operation 208. At operation 208, the server computer 102 can generate and/or store vector data 114 that represents the data included in the logs 108. As illustrated and described in FIG.

1, the vector data 114 can include, but is not limited to, subscriber data (identifying the subscriber), behavior data (defining behavior of the subscriber), status data (defining whether the subscriber is mobile or stationary in a particular cell), location data (defining a location associated with each cell), date/time data (defining times at which the subscriber entered and/or exited each cell), cell identification data that identifies the cells, duration data that defines a time the subscriber was in each cell, vectors that define the vectors as defined herein as cell IDs visited by a subscriber, other data, combinations thereof, or the like. Thus, though not separately shown in FIG. 2, the server computer 102 can generate the vector data by analyzing the logs 108 and the vectors determined in operation 206.

In particular, the server computer 102 can analyze the logs 108 and/or the vectors to determine times and/or durations associated with presence of a subscriber in a particular cell, as well as cell identification data and/or geographic location data defining a location of the cell. The server computer 102 also can determine, based upon the vectors identified in operation 206, durations in each cell included in the vector, rates of speed through or near cells included in the vector, whether a subscriber is travelling through or within the cells, whether a subscriber is stationary in a cell, and/or other aspects of a subscriber's presence in a cell. In some embodiments, for example, the server computer can calculate or derive other values based upon the known values from the logs 108 such as the entry and exit time. One example of calculated or derived data is shown below in TABLE 3. In particular, the subscriber identity ("Sub."), the entry data, the exit data, and the cell data can be data included in the logs 108, while the duration data ("Stay") and the status data ("Status") can be derived based upon the logs 108.

TABLE 3

| Sub. | Entry | Exit | Cell | Stay | Status |
|------|-------|------|------|------|--------|
| S1 | 11-12-2014_19:37 | 11-13-2014_07:41 | A | 724 Minutes | Stationary |
| S1 | 11-13-2014_07:41 | 11-13-2014_08:08 | B | 27 minutes | Slowly Moving |
| S1 | 11-13-2014_08:08 | 11-13-2014_08:11 | C | 3 minutes | Moving |

It should be understood that other data can be included in and/or extrapolated from the logs 108, and that the above example is therefore illustrative.

From operation 208, the method 200 proceeds to operation 210. The method 200 ends at operation 210.

Figure 3:
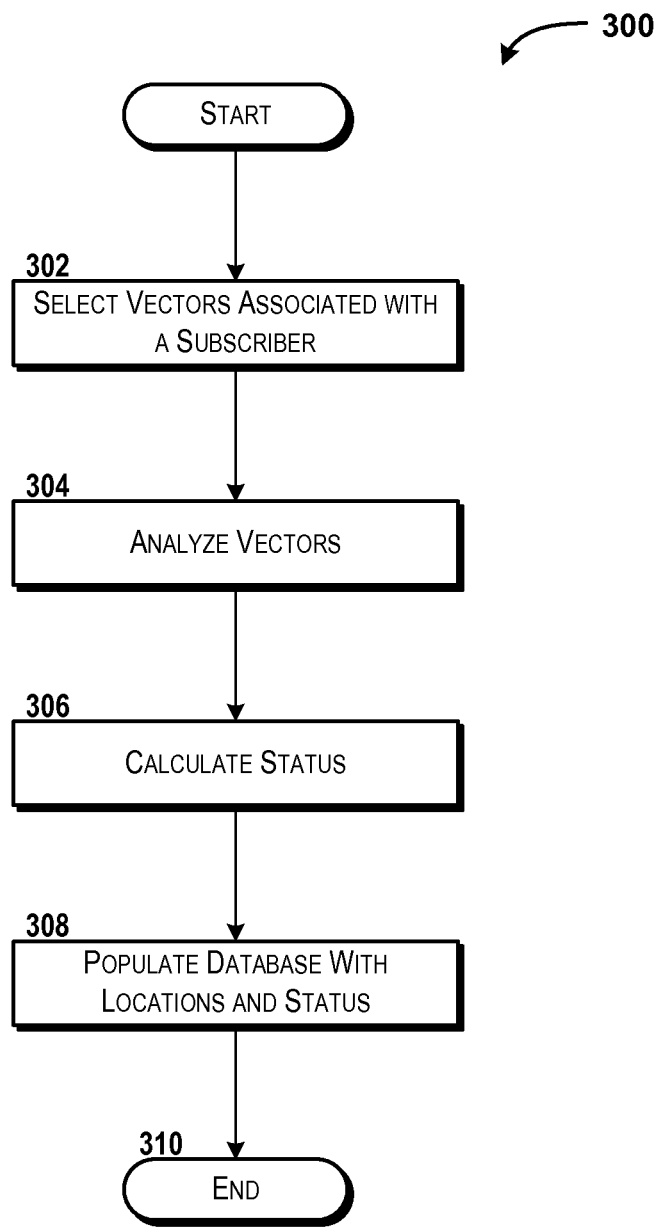
FIG. 3 is a flow diagram showing aspects of a method for determining locations and statuses associated with subscribers based upon vector data, according to an illustrative embodiment.

Turning now to FIG. 3, aspects of a method 300 for determining locations and statuses associated with subscribers based upon vector data 114 will be described in detail, according to an illustrative embodiment. The method 300 begins at operation 302. At operation 302, the server computer 102 can select one or more vectors associated with a subscriber. The subscriber can be selected based upon various considerations including, but not limited to, a query 124 relating to a particular subscriber, an operation in which all subscribers are analyzed, combinations thereof, or the like. Furthermore, the selection of vectors can be based upon various considerations.

In some embodiments, a subscriber is identified for analysis, and because the vector data 114 can include subscriber data, the vectors associated with the selected subscriber can be selected. Because the vectors associated with a particular subscriber can be selected in various ways and/or for various purposes, it should be understood that this example is illustrative and therefore should not be construed as being limiting in any way.

From operation 302, the method 300 proceeds to operation 304. At operation 304, the server computer 102 can analyze the vectors selected in operation 302. The vectors can be analyzed to determine, among other things, cells included in each of the vectors, locations associated with the cells included in the vectors, times and/or durations of time spent in cells included in the vector, or the like. Based upon this analysis, the server computer 102 can determine a status associated with the subscriber with respect to one or more cell included in or associated with the vectors analyzed.

From operation 304, the method 300 proceeds to operation 306. At operation 306, the server computer 102 can calculate statuses associated with the subscriber based upon the analysis of the vectors analyzed in operation 304. The status can include, for example, stationary, mobile, quickly moving, slowly moving, combinations thereof, or the like. The server computer 102 can be configured to assign the status based upon the duration of time spent within a cell, calculated distances between an entry point and exit point, and/or based upon other information. If, for example, a subscriber is located within a cell for a particular duration of time or longer, the server computer 102 can determine that the subscriber is stationary within that cell. The server computer 102 can be configured to consider rates of movement, speeds, or the like, as well as other considerations in determining the status. It should be understood that this example is illustrative and therefore should not be construed as being limiting in any way.

Also, as noted above, types of traffic associated with particular cells, the sizes of the cells, and/or other information can be used to set a time duration for a cell. As such, a duration of five minutes may indicate a mobility status in one cell included in a particular vector and a stationary status in another cell of the vector. Thus, the other data shown in FIG. 1 can define, for cells and/or cell IDs, a threshold or time that is to be used to define a status for a subscriber located within that cell for a particular duration of time. It should be understood that this example is illustrative and therefore should not be construed as being limiting in any way.

From operation 306, the method 300 proceeds to operation 308. At operation 308, the server computer 102 can populate a database, table, or other data structure with data indicating the statuses calculated or otherwise determined in operation 306 and data identifying a location such as a cell ID or geographic location corresponding to the cell ID. As such, the server computer 102 can generate data that represents, for a particular subscriber, a status when located within a particular cell. It should be understood that this example is illustrative and therefore should not be construed as being limiting in any way.

From operation 308, the method 300 proceeds to operation 310. The method 300 ends at operation 310.

Figure 4:
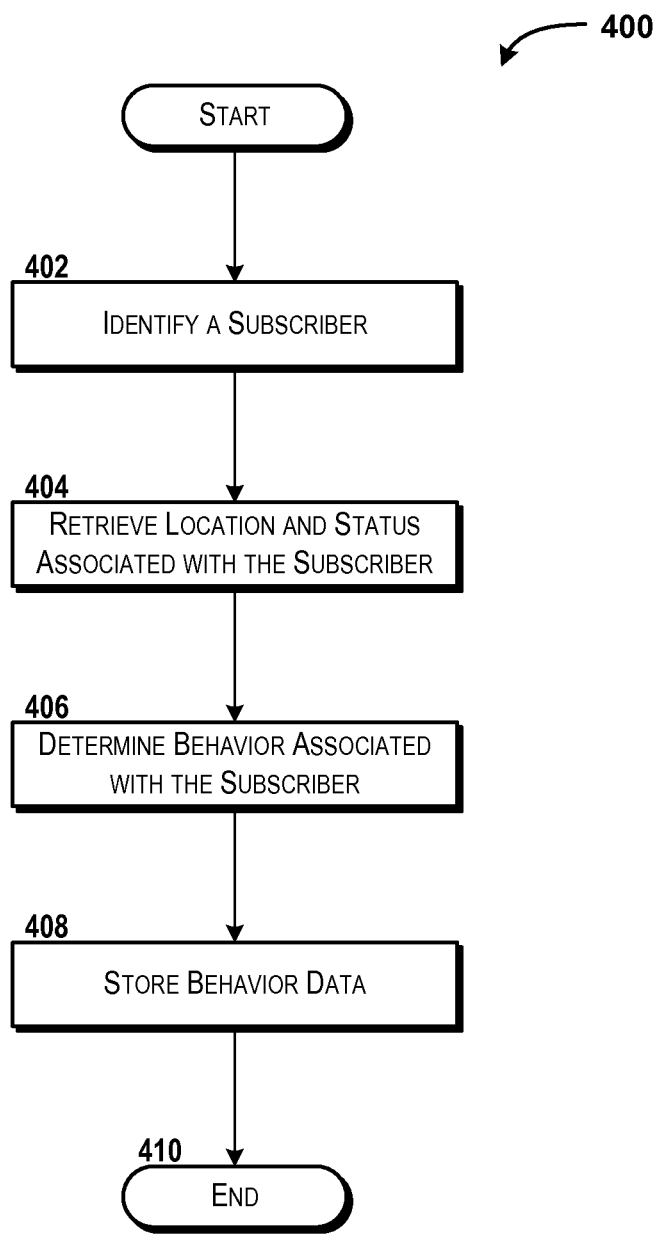
FIG. 4 is a flow diagram showing aspects of a method for determining behaviors associated with subscribers based upon vector data, according to an illustrative embodiment.

Turning now to FIG. 4, aspects of a method 400 for determining behaviors associated with subscribers based upon vector data 114 will be described in detail, according to an illustrative embodiment. The method 400 begins at operation 402. At operation 402, the server computer 102 can identify a subscriber. As used herein, "identifying" a subscriber can be used to refer to determining that a data associated with a particular subscriber is to be analyzed.

Thus, a subscriber can be selected in operation 402 for analysis in the method 400, though this is not necessarily the case.

The subscriber can be identified based upon various criteria. In one embodiment of the concepts and technologies described herein, a subscriber is identified and the method 400 is performed. After performing the method 400, the server computer 102 can determine if another subscriber is represented by or in the vector data 114. If so, the method 400 can be repeated for the other subscriber, and this process can be repeated until some or all of the subscribers represented by the vector data 114 have been selected.

From operation 402, the method 400 proceeds to operation 404. At operation 404, the server computer 102 can retrieve location data and status data associated with the subscriber. As explained above with reference to FIG. 3, the location and status data can indicate, for a particular subscriber and/or for multiple subscribers, a status associated with a subscriber when at a particular location such as a cell or the like. The locations can include the cells visited by the subscriber and/or geographic locations corresponding to the cells, which may be determined by using GIS data, or the like. Thus, the location data and the status data can indicate, for subscribers, a status associated with the subscribers at particular cells or other locations.

From operation 404, the method 400 proceeds to operation 406. At operation 406, the server computer 102 can determine behavior associated with the subscriber identified in operation 402. The behavior can define, for a subscriber and based upon the status associated with the location, a behavior of the subscriber. For example, if a subscriber is stationary within a particular cell five days a week for approximately eight hours per day in a typical work day (or other duration of a work day, which can be known or determined by the server computer 102), the server computer 102 can be configured to define that cell as corresponding to a work location associated with the subscriber. In another example, if a subscriber is stationary at a particular cell on the weekends and each night, the server computer 102 can be configured to define that cell as corresponding to a home location associated with the subscriber. It should be understood that these examples are illustrative and therefore should not be construed as being limiting in any way.

Similarly, if a subscriber passes through particular cells each day between defined locations such as a home location and a work location, the cells through which the subscriber passes can be defined as travel cells for that subscriber. These and other analyses can be used, for example, to determine various locations and/or behaviors associated with the subscriber. For example, times at which a subscriber is located at home can be determined based upon movements of the subscriber and/or statuses associated with particular cells, and the like. It should be understood that this example is illustrative and therefore should not be construed as being limiting in any way.

From operation 406, the method 400 proceeds to operation 408. At operation 408, the server computer 102 can generate and/or store behavior data that represents the behavior determined in operation 406. The behavior data can define, for example, a behavior such as located at home, located at work, located at a work location, travelling, located at a shopping location, or the like for one or more cells. It should be understood that these examples are illustrative and therefore should not be construed as being limiting in any way.

From operation 408, the method 400 proceeds to operation 410. The method 400 ends at operation 410.

Figure 5:
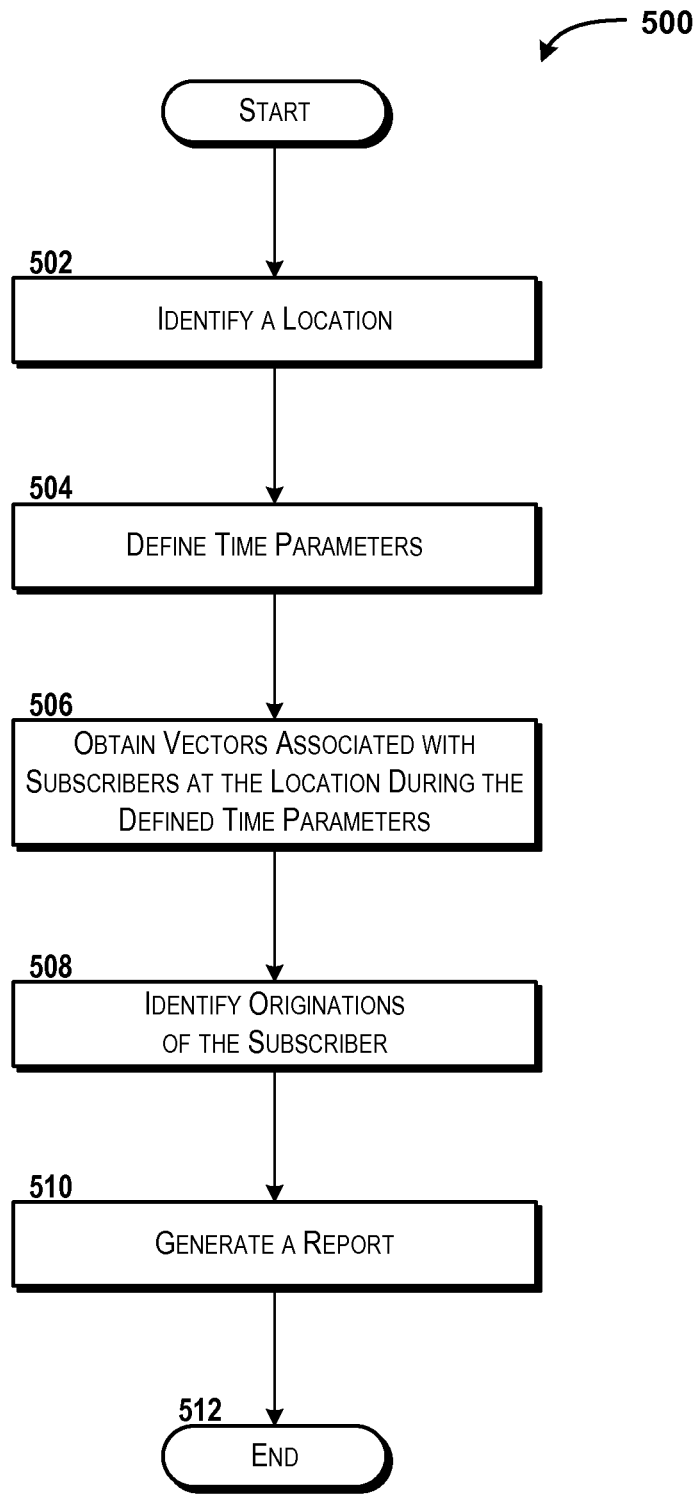
FIG. 5 is a flow diagram showing aspects of a method for identifying visitors at a location based upon vector data, according to an illustrative embodiment.

Turning now to FIG. 5, aspects of a method 500 for identifying visitors at a location based upon vector data 114 will be described in detail, according to an illustrative embodiment. The method 500 begins at operation 502. At operation 502, the server computer 102 can identify a location of interest for analysis. The location of interest can be determined based upon a query 124 and/or based upon other considerations. In one contemplated embodiment, an entity associated with a shopping mall or other retail location may wish to analyze origination locations associated with shoppers as part of a marketing analysis (e.g., to determine locations to which advertising should be focused). An entity associated with the server computer 102, for example a network operator or carrier, may execute the method 500 to obtain this information or other information and/or to generate a report 126 that captures this or other information.

From operation 502, the method 500 can proceed to operation 504. In operation 504, the server computer 102 can define time parameters for the analysis performed in the method 500 with respect to the location identified in operation 502. In particular, a time of day, day of the week, or the like can be defined for the analysis described herein with reference to FIG. 5 and/or for other analysis defined herein. In the above example of a shopping mall, a particular day of the week or time of day can be defined for the analysis. Thus, for example, the server computer 102 can define a time of day and/or a day of the week to analyze in the method 500.

Additionally, the time defined in operation 504 can also include a duration. As such, only subscribers located at the location defined in operation 502 for a duration defined in operation 504 may be considered, in some embodiments. In one example embodiment of operation 504 with respect to the above example of the shopping mall, operation 504 can correspond to specifying a day of week (e.g., Sunday), a time of day (e.g., 10:00 AM to 1:00 PM), and a duration (e.g., one hour or more). Thus, the server computer 102 can, during performance of the method 500 described herein, consider vectors associated with only those subscribers that satisfy the location identified in operation 502 and the time parameters defined in operation 504. It should be understood that this example is illustrative and therefore should not be construed as being limiting in any way.

From operation 504, the method 500 proceeds to operation 506. At operation 506, the server computer 102 can obtain or retrieve vectors associated with subscriber located at the location identified in operation 502 during the time parameters defined in operation 504. As explained in detail herein, the vectors can define cells visited by subscribers. The vectors and various other data such as cell entry and/or exit times, durations in cells, and the like, can be captured as vector data 114. As such, the vector data 114 can include various data associations, thereby allowing retrieval of the various data shown in FIG. 1 with respect to the vector data 114 based upon knowledge or identification of any of the other data shown in FIG. 1 with respect to the vector data 114. Thus, for example, with knowledge or identification of a location and/or time/date information, the server computer 102 can access or query the vector data 114 to obtain vectors, behavior data, status data, location data, date/time data, cell ID data, duration data, other data, combinations thereof, or the like, associated with one or more subscribers at a particular location at a particular time, or the like.

In operation 506, the server computer 102 can identify subscribers at a particular location at a given time, and analyze vectors associated with those subscribers (e.g., by performing a lookup in the vector data 114 based upon the subscriber identity). The server computer 102 can identity subscribers that satisfy the location information and determine if the time parameters are satisfied (e.g., has the subscriber been present at the location for one hour or longer on the defined day and/or at the defined time). Vectors associated with subscribers that satisfy the location and time requirements can be obtained in operation 506. It should be understood that these examples are illustrative and therefore should not be construed as being limiting in any way.

From operation 506, the method 500 proceeds to operation 508. At operation 508, the server computer 102 can identify an origination or source of one or more subscribers identified in operation 506 based upon the vectors obtained in operation 506. In particular, the server computer 102 can be configured to determine a start point associated with a particular vector or number of vectors and identify a cell or other location associated with that start point. For example, if a vector for a subscriber is Cell A, Cell B, Cell C (or simply ABC), wherein in this example Cell C can correspond to a shopping mall, the server computer 102 can be configured to recognize a start point or origination as Cell A.

Similarly, if another subscriber is associated with a vector Cell P, Cell O, Cell L, Cell K, Cell C (or simply POLKC), the server computer can be configured to recognize a start point for the subscriber as Cell P. Thus, the server computer 102 can determine, for a subscriber in a cell and/or for groups of subscribers at a particular location, where the subscriber(s) originated. The server computer 102 also can generate reports that define, for one or more (or one or more groups of) subscribers at a particular location at a particular time, origination points associated with those subscribers and/or groups of subscribers. It should be understood that this example is illustrative and therefore should not be construed as being limiting in any way.

From operation 508, the method 500 proceeds to operation 510. At operation 510, the server computer 102 can generate a report 126. In some embodiments, the report 126 can be used to present the determined originations for subscribers and/or groups of subscribers with graphs and/or percentages. It should be understood that this example is illustrative and therefore should not be construed as being limiting in any way.

In the example of the shopping mall presented above, the server computer 102 can identify two or more groups of subscribers located at the location identified in operation 502 at the times defined in operation 504. For example, the server computer 102 may define a first group of four hundred thirty subscribers located at the mall at the defined time, date, and for the defined duration. The first group may have originated from Cell A. Similarly, the server computer 102 may define a second group of one hundred seventy subscribers located at the mall at the defined time, date, and for the defined duration. The first group may have originated from Cell P. In this example, the server computer 102 can generate a report 126 that includes, for example, a total count of six hundred subscribers located at the location at the defined time, date, and for the defined duration.

The report 126 also can indicate percentages and/or graphs. For example, graphs and/or percentages may indicate that 71.67% of the four hundred visitors at the shopping mall came from a neighborhood covered by Cell A, while 28.33% of the visitors came from a neighborhood covered by Cell P. Based upon this information, the entity associated with the shopping mall may determine that additional marketing is to be directed to Cell A or Cell P, depending upon needs and/or desires of the entity and/or the shopping mall. It should be understood that this example is illustrative and therefore should not be construed as being limiting in any way.

While the above embodiment of the method 500 has been described as being performed by identifying subscribers, obtaining vectors associated with the subscribers, and identifying originations of the subscribers to identify visitors to a particular cell, it should be understood that other embodiments of identifying visitors to particular cell are possible and are contemplated. Furthermore, the above embodiment has described defining a duration and determining if the visitors satisfy the defined duration. Other embodiments of the concepts and technologies described herein can use other approaches to identify visitors to a particular location for a defined duration. In particular, the server computer 102 can be configured to identify visitors to cells by obtaining behavior data associated with subscribers located with the cell and determining, for each of the subscribers, if the cell corresponds to a home location or work location cell for the subscriber. If the cell does not correspond to a work location and/or home location for the subscriber, the server computer 102 can be configured to define the subscriber as a visitor and to determine if the status for the subscriber is stationary (which may meet the defined time parameters as discussed with reference to operation 504) or the like. It should be understood that these examples are illustrative and therefore should not be construed as being limiting in any way.

From operation 510, the method 500 proceeds to operation 512. The method 500 ends at operation 512.

Figure 6:
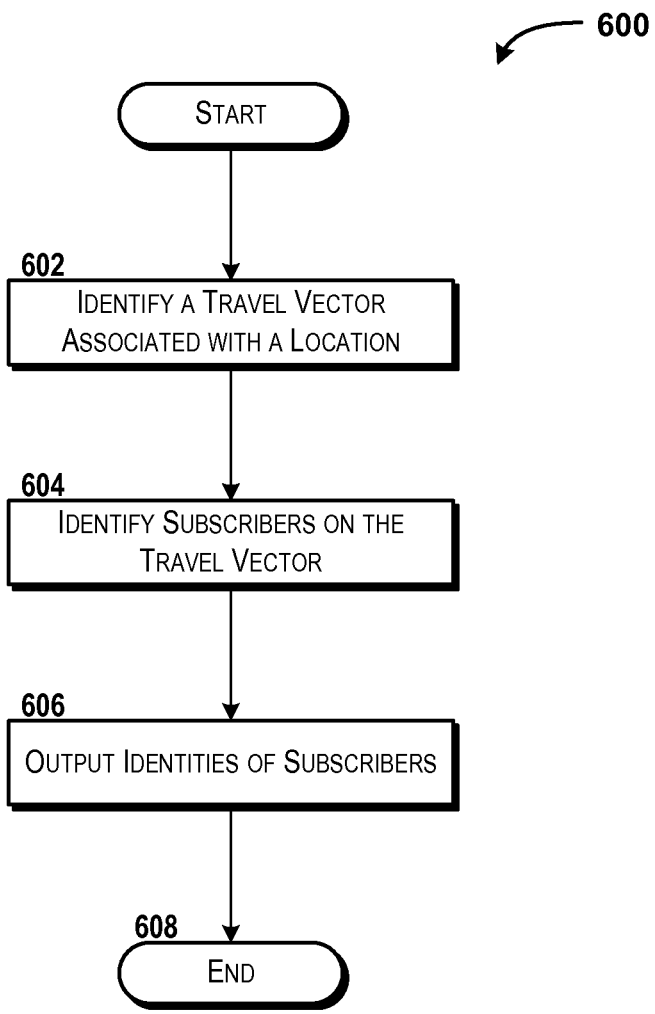
FIG. 6 is a flow diagram showing aspects of a method for identifying subscribers along a travel vector based upon vector data, according to an illustrative embodiment.

Turning now to FIG. 6, aspects of a method 600 for identifying subscribers along a travel vector based upon vector data 114 will be described in detail, according to an illustrative embodiment. The method 600 begins at operation 602. At operation 602, the server computer 102 can identify a travel vector associated with a location. The travel vectors can be defined, for example, for one or more subscribers and travel vectors can defined by and/or stored as the other data shown in FIG. 1.

According to various embodiments, the server computer 102 can map roads, railroad tracks, waterways, or other travel routes to cells using location information and cell location information. Thus, for example, the server computer can determine that a travel vector between two locations includes the cells Cell A-Cell B-Cell C-Cell D-Cell E, and these cells can be mapped to a particular road or other travel route using GIS data or the like. For example, the cells ABCDE or the reverse, namely EDCBA, can be mapped to a highway using GIS data, and if a vector for a subscriber is determined to include ABCDE or EDCBA, the subscriber can be determined to be travelling along the highway. It should be understood that this example is illustrative and therefore should not be construed as being limiting in any way. Based upon this determination, the server computer can determine that any subscriber that passes through cells Cell A, Cell B, Cell C, Cell D, and Cell E is travelling along the route associated with the travel vector.

Similarly, the server computer 102 can be configured to determine, based upon an order in which the subscriber is located with the cells, a rate and/or direction in which the subscriber is moving. Thus, for example, if Cell A is north of Cell B, Cell B is north of Cell C, Cell C is north of Cell D, and Cell D is north of Cell E, a vector for a subscriber that indicates that the subscriber passed through Cell A, Cell B, Cell C, Cell D, and Cell E in that order can be understood to indicate that the subscriber was travelling south. Similarly, a vector for a subscriber that indicates that the subscriber passed through Cell E, Cell D, Cell C, Cell B, and Cell A in that order can be understood to indicate that the subscriber was travelling north. By determining a number of subscribers at a particular time and/or at various times with vectors ABCDE or EDCBA, the server computer 102 can determine a number of subscribers located on the route at a particular time, a number of subscribers travelling in each direction along the route at a particular time, a total number of subscribers travelling on the route during any desired time frame, combinations thereof, or the like. It should be understood that these examples are illustrative and therefore should not be construed as being limiting in any way.

From operation 602, the method 600 proceeds to operation 604. At operation 604, the server computer 102 can identify one or more subscribers along the travel vector. According to various embodiments, the server computer 102 can query the logs 108 and/or the vector data 114 to identify one or more subscribers having a vector that crosses and/or is associated with one or more travel vectors. Thus, with reference to the above example, the server computer 102 can query the vector data 114 to identify one or more subscribers that passed through Cell A, Cell B, Cell C, Cell D, and Cell E and/or through Cell E, Cell D, Cell C, Cell B, and Cell A in either of those two orders. Similarly, subscribers that traversed part of a travel vector (e.g., Cell A, Cell B, and Cell C) may be assumed by the server computer 102 to have travelled along part of a travel vector.

From operation 604, the method 600 proceeds to operation 606. At operation 606, the server computer 102 can output identities of one or more subscribers identified in operation 604. The identities of the subscribers can be output for various purposes. For example, the identities can be output to allow generation of advertisements related to the travel route, for resource allocation purposes, for capacity planning purposes, combinations thereof, or the like. Because the identities of travelling subscribers can be output for additional and/or alternative reasons, it should be understood that these examples are illustrative and therefore should not be construed as being limiting in any way.

From operation 606, the method 600 proceeds to operation 608. The method 600 ends at operation 608.

Figure 7:
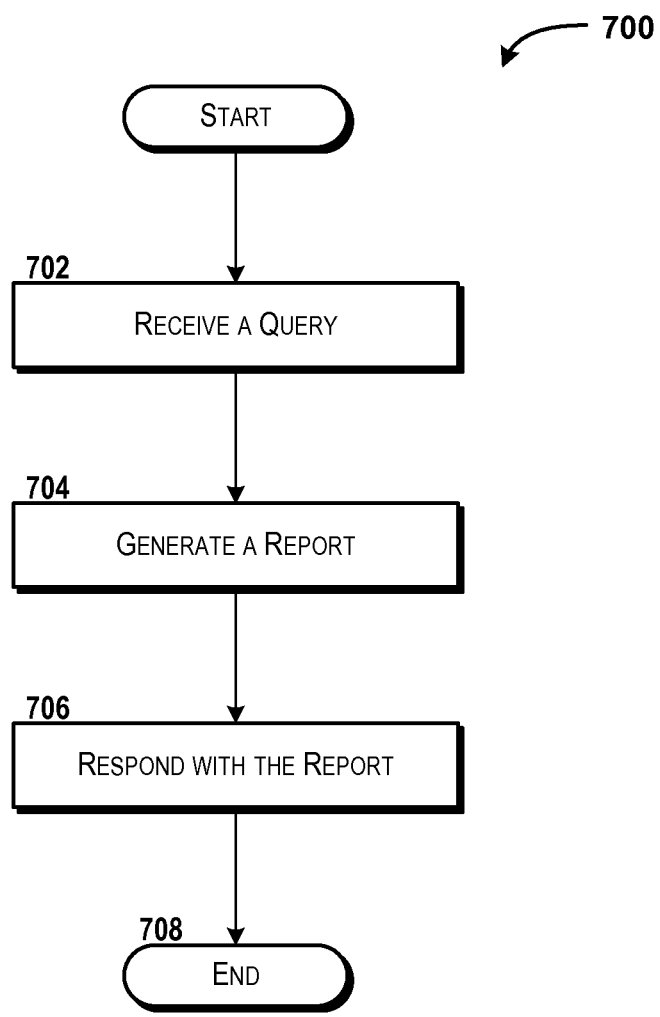
FIG. 7 is a flow diagram showing aspects of a method for providing a report based on vector data, according to another illustrative embodiment.

Turning now to FIG. 7, aspects of a method 700 for providing a report based on vector data will be described in detail, according to an illustrative embodiment. The method 700 begins at operation 702. At operation 702, the server computer 102 can receive a query 124. The query 124 can be used to request a report 126 relating to the vector data 114. For example, the query 124 may request identification of subscribers travelling in a cell, subscribers who live in a cell, subscribers who work in a cell, subscribers who are visiting a cell, numbers of subscribers in a cell, one or more subscribers along a travel path, behaviors of subscribers in a cell, duration of subscribers in a cell, dates and times of entry and/or exits to or from cells, statuses of subscribers in a cell, combinations thereof, or the like. Because the query 124 can relate to additional and/or alternative information, it should be understood that this example is illustrative and therefore should not be construed as being limiting in any way.

From operation 702, the method 700 proceeds to operation 704. At operation 704, the server computer 102 can generate a report 126. The server computer 102 can execute the query received in operation 702 against the vector data 114, or can analyze the vector data 114 to identify data that is responsive to the query 124. The server computer 102 can generate the report 126 to include vector data 114 that is responsive to the query 124. Thus, for example, the report 126 can include data representing identities of subscribers, vectors, travel vectors or routes, locations, numbers of subscribers, capacities, usage at various times, or the like. Because the reports 126 can be responsive to the query 124, which as noted above can relate to various aspects of the vector data 114 not addressed in these examples, it should be understood that these examples are illustrative and therefore should not be construed as being limiting in any way From operation 704, the method 700 proceeds to operation 706. At operation 706, the server computer 102 can respond to the query 124 with the report 126 generated in operation 704. The report 126 can be output as a file, as a data structure with data entries; as user interfaces; as links to reports, tables, or user interfaces; as other types of data; combinations thereof or the like. The reports 126 can be transmitted or made available to the requestor or other entity. The entity that receives or obtains the reports 126 can be configured to generate one or more UIs 128 to present the data in the reports 126, to forward the reports 126 or data in the reports 126 to various entities, or the like.

From operation 706, the method 700 proceeds to operation 708. The method 700 ends at operation 708.

Figure 8:
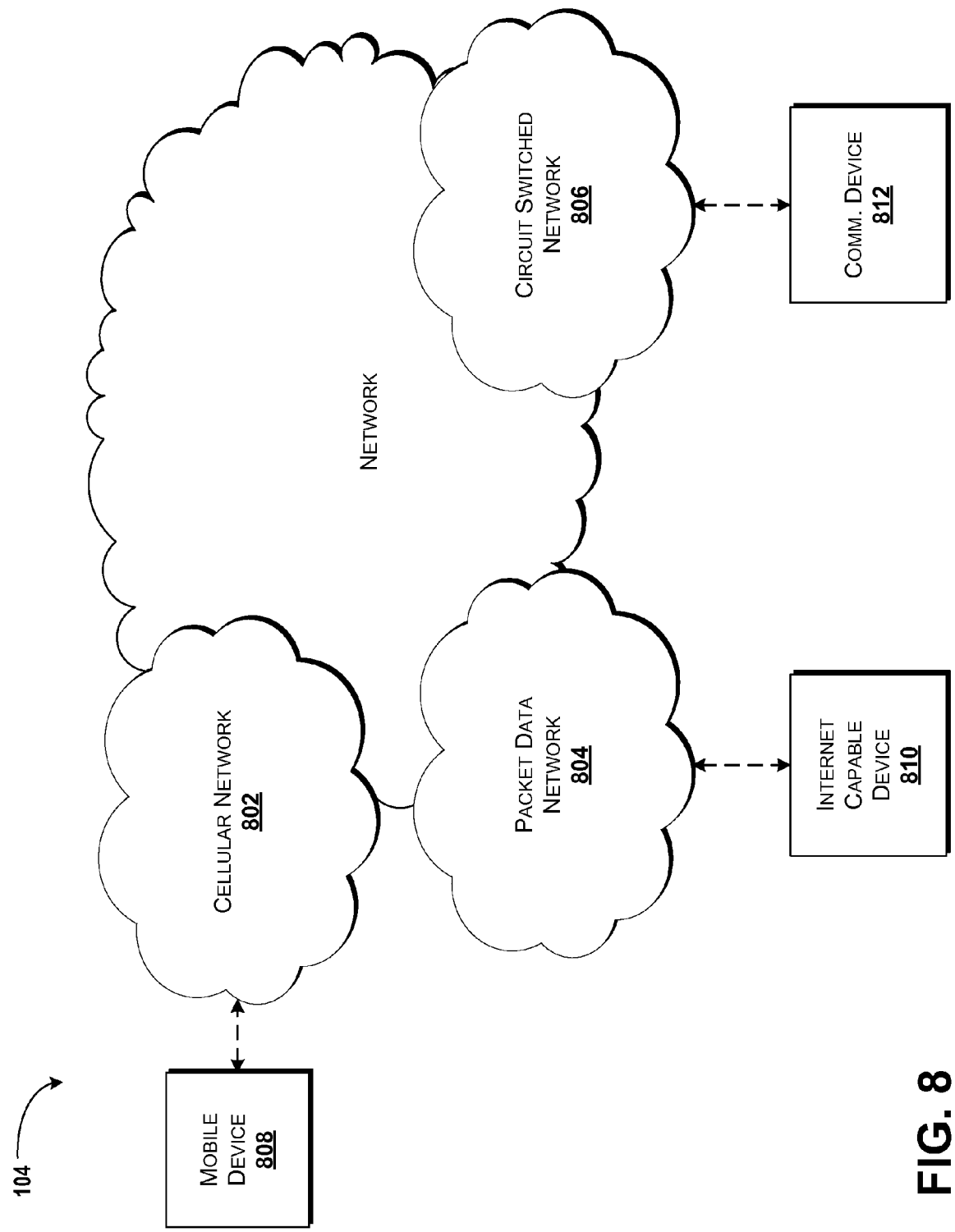
FIG. 8 schematically illustrates a network, according to an illustrative embodiment.

Turning now to FIG. 8, additional details of the network 104 are illustrated, according to an illustrative embodiment. The network 104 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the networks 802, 804, 806. It should be appreciated that substantially all of the functionality described with reference to the network 104 can be performed by the cellular network 802, the packet data network 804, and/or the circuit switched network 806, alone or in combination with other networks, network elements, and the like.

Figure 9:
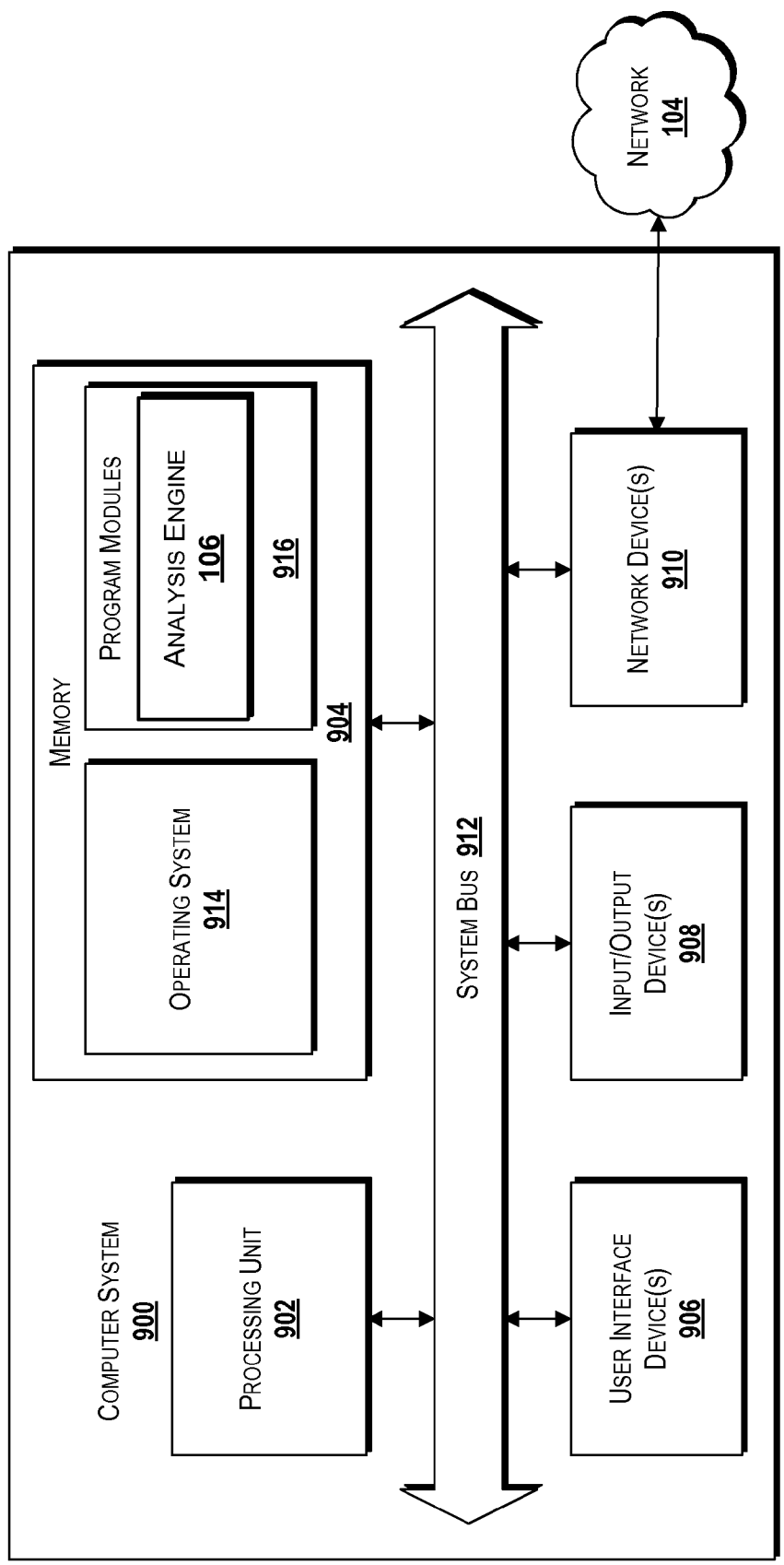
FIG. 9 is a block diagram illustrating an example computer system configured to generating and analyzing mobility vectors to determine subscriber behavior, according to some illustrative embodiments.

FIG. 9 is a block diagram illustrating a computer system 900 configured to provide the functionality described herein for generating and analyzing mobility vectors to determine subscriber behavior, in accordance with various embodiments of the concepts and technologies disclosed herein. The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 include the analysis engine 106 illustrated and described in FIG. 1. This and/or other programs can be embodied in computer-readable media containing instructions that, when executed by the processing unit 902, perform one or more of the methods 200, 300, 400, 500, 600, 700 described in detail above with respect to FIGS. 2-7. According to embodiments, the program modules 916 may be embodied in hardware, software, firmware, or any combination thereof. Although not shown in FIG. 9, it should be understood that the memory 904 also can be configured to store the vector data 114, the logs 108, the queries 124, the reports 126, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for generating and analyzing mobility vectors to determine subscriber behavior have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
   obtaining, at a processor executing an analysis engine, a log from a data collection device associated with a cellular network, the log comprising subscriber data, cell identifier data, and time data;
   identifying, by the processor, a subscriber represented by the subscriber data;
   determining, by the processor and based on the cell identifier data and the time data, a vector associated with the subscriber, wherein the vector comprises a list of cell identifiers that correspond to two cells of the cellular network, wherein the two cells were visited by a device associated with the subscriber, wherein the vector represents a movement of the device, and wherein the time data represents a time at which a handoff associated with the device occurred between a first of the two cells and a second of the two cells;
   analyzing, by the processor, the vector to calculate a status associated with the subscriber at a cell of the vector determined, wherein the status is based on a distance travelled by the subscriber in the cell, which is based on a distance calculated between an entry point and an exit point associated with the cell; and
   storing, by the processor, status data that represents the status determined.

2. The method of claim 1, wherein the subscriber data identifies the subscriber, wherein the cell identifier data identifies a cell of the cellular network with which the device associated with the subscriber communicated, and wherein the time data identifies a time at which the device communicated with the cell.

3. The method of claim 1, further comprising:
   storing, by the processor, vector data that corresponds to the vector determined; and
   storing, by the processor, the status data as a portion of the vector data.

4. The method of claim 1, wherein the status indicates that the subscriber is one of mobile and stationary.

5. The method of claim 3, further comprising:
   retrieving, by the processor, the status data associated with the subscriber;
   determining, by the processor, a behavior associated with the subscriber if the subscriber is located at the cell; and
   storing, by the processor, behavior data that represents the behavior determined, wherein the behavior data is stored as a further portion of the vector data.

6. The method of claim 5, wherein the behavior indicates that at a time at which the subscriber was located within the cell, the subscriber was one of
   located at home,
   located at work, or
   travelling.

7. The method of claim 1, further comprising:
   identifying, by the processor, a further subscriber that is located within a cell;
   determining, by the processor, an origination cell associated with the further subscriber, wherein the origination cell comprises a first cell identified by a first cell identifier included in a further vector associated with the further subscriber, and wherein the origination cell comprises one of a work cell and a home cell;
   determining, by the processor, that the cell and the origination cell do not match; and
   determining, by the processor, that the further subscriber is a visitor when located at the cell in response to determining that the cell and the origination cell do not match.

8. The method of claim 1, further comprising:
   determining, by the processor, a travel vector associated with the cellular network, the travel vector comprising a plurality of cells corresponding to a travel route through a geographic location covered by the plurality of cells;
   storing, by the processor, data defining the travel vector as part of the vector data;
   identifying, by the processor, a further subscriber that is located at one of the plurality of cells associated with the travel vector; and
   identifying, by the processor, the further subscriber as a travelling subscriber.

9. The method of claim 7, wherein a determination that the further subscriber is the visitor is used for capacity planning.

10. The method of claim 7, wherein in response to determining that the further subscriber is the visitor, an advertisement for the further subscriber is determined and transmitted.

11. A system comprising:
a processor; and
a memory that stores computer-executable instructions that, when executed by the processor, cause the processor to perform operations comprising
obtaining a log from a data collection device associated with a cellular network, the log comprising subscriber data, cell identifier data, and time data,
identifying a subscriber represented by the subscriber data,
determining, based on the cell identifier data, a vector associated with the subscriber, wherein the vector comprises a list of cell identifiers that correspond to two cells of the cellular network, wherein the two cells were visited by a device associated with the subscriber, wherein the vector represents a movement of the device, and wherein the time data represents a time at which a handoff associated with the device occurred between a first of the two cells and a second of the two cells,
analyzing the vector to calculate a status associated with the subscriber at a cell of the vector determined, wherein the status is based on a distance travelled by the subscriber in the cell, which is based on a distance calculated between an entry point and an exit point associated with the cell, and
storing status data that represents the status determined.

12. The system of claim 11, wherein the log comprises data defining handoffs between cells of the cellular network, and wherein the data collection device comprises a home location register associated with the cellular network.

13. The system of claim 11, wherein the computer-executable instructions, when executed by the processor, cause the processor to perform operations further comprising:
storing vector data that corresponds to the vector determined;
storing the status data as a portion of the vector data;
retrieving the status data associated with the subscriber;
determining a behavior associated with the subscriber if the subscriber is located at the cell; and
storing behavior data that represents the behavior determined, wherein the behavior data is stored as a further portion of the vector data.

14. The system of claim 11, wherein the computer-executable instructions, when executed by the processor, cause the processor to perform operations further comprising:
identifying a further subscriber that is located within a cell;
determining an origination cell associated with the further subscriber, wherein the origination cell comprises a first cell identified by a first cell identifier included in a further vector associated with the further subscriber, and wherein the origination cell comprises one of a work cell and a home cell;
determining that the cell and the origination cell do not match; and
determining that the further subscriber is a visitor when located at the cell in response to determining that the cell and the origination cell do not match.

15. The system of claim 14, wherein a determination that the further subscriber is the visitor is used for capacity planning.

16. The system of claim 14, wherein in response to determining that the further subscriber is the visitor, an advertisement for the further subscriber is determined and transmitted.

17. A computer storage medium having computer-executable instructions stored thereon that, when executed by a processor, cause the processor to perform operations comprising:
obtaining a log from a data collection device associated with a cellular network, the log comprising subscriber data, cell identifier data, and time data;
identifying a subscriber represented by the subscriber data;
determining, based on the cell identifier data, a vector associated with the subscriber, wherein the vector comprises a list of cell identifiers that correspond to two cells of the cellular network, wherein the two cells were visited by a device associated with the subscriber, wherein the vector represents a movement of the device, and wherein the time data represents a time at which a handoff associated with the device occurred between a first of the two cells and a second of the two cells;
analyzing the vector to calculate a status associated with the subscriber at a cell of the vector determined, wherein the status is based on a distance travelled by the subscriber in the cell, which is based on a distance calculated between an entry point and an exit point associated with the cell; and
storing status data that represents to the status determined.

18. The computer storage medium of claim 17, wherein the computer-executable instructions, when executed by the processor, cause the processor to perform operations further comprising:
storing vector data that corresponds to the vector determined;
storing the status data as a portion of the vector data;
retrieving the status data associated with the subscriber;
determining a behavior associated with the subscriber if the subscriber is located at the cell; and
storing behavior data that represents the behavior determined, wherein the behavior data is stored as a further portion of the vector data.

19. The computer storage medium of claim 17, wherein the computer-executable instructions, when executed by the processor, cause the processor to perform operations further comprising:
identifying a further subscriber located within a cell;
determining an origination cell associated with the further subscriber, wherein the origination cell comprises a first cell identified by a first cell identifier included in a further vector associated with the further subscriber, and wherein the origination cell comprises one of a work cell and a home cell;
determining that the cell and the origination cell do not match; and
determining that the further subscriber is a visitor when located at the cell in response to determining that the cell and the origination cell do not match.

20. The computer storage medium of claim 19, wherein a determination that the further subscriber is the visitor is used for capacity planning.

21. The computer storage medium of claim 19, wherein in response to determining that the further subscriber is the visitor, an advertisement for the further subscriber is determined and transmitted.

\* \* \* \* \*